United States Patent
Das et al.

(10) Patent No.: US 7,362,919 B2
(45) Date of Patent: Apr. 22, 2008

(54) METHOD FOR GENERATING CUSTOMIZED PHOTO ALBUM PAGES AND PRINTS BASED ON PEOPLE AND GENDER PROFILES

(75) Inventors: Madirakshi Das, Rochester, NY (US); Alexander C. Loui, Penfield, NY (US)

(73) Assignee: Eastman Kodak Company, Rochester, NY (US)

(*) Notice: Subject to any disclaimer, the term of this patent is extended or adjusted under 35 U.S.C. 154(b) by 782 days.

(21) Appl. No.: 10/722,308

(22) Filed: Nov. 25, 2003

(65) Prior Publication Data

US 2005/0111737 A1    May 26, 2005

Related U.S. Application Data

(60) Provisional application No. 60/432,900, filed on Dec. 12, 2002.

(51) Int. Cl.
*G06K 9/36* (2006.01)

(52) U.S. Cl. ................... 382/284; 382/305

(58) Field of Classification Search ............. 382/118, 382/190, 224–225, 305, 284, 309; 345/629; 348/584; 715/517, 523
See application file for complete search history.

(56) References Cited

U.S. PATENT DOCUMENTS

| | | | | |
|---|---|---|---|---|
| 5,781,650 | A |  7/1998 | Lobo et al. ............ | 382/118 |
| 6,202,061 | B1 |  3/2001 | Khosla et al. | |
| 6,222,947 | B1 * |  4/2001 | Koba .................... | 382/284 |
| 6,351,556 | B1 |  2/2002 | Loui et al. .............. | 382/164 |
| 6,389,181 | B2 |  5/2002 | Shaffer et al. .......... | 382/305 |
| 6,606,398 | B2 * |  8/2003 | Cooper ................. | 382/118 |
| 6,608,563 | B2 * |  8/2003 | Weston et al. ......... | 340/573.1 |
| 7,203,367 | B2 * |  4/2007 | Shniberg et al. ....... | 382/224 |
| 2002/0039447 | A1 |  4/2002 | Shniberg et al. | |
| 2002/0059322 | A1 |  5/2002 | Miyazaki et al. | |

(Continued)

FOREIGN PATENT DOCUMENTS

EP    0990996 A2    4/2000

(Continued)

OTHER PUBLICATIONS

Canon "Creative Photo Sharing", pp. 1-20, 1999.*

(Continued)

*Primary Examiner*—Daniel Mariam
(74) *Attorney, Agent, or Firm*—David M. Woods

(57) ABSTRACT

A method for generating customized photo album pages for a collection of digital images comprises the steps of: (a) obtaining a plurality of digital images; (b) automatically grouping the images into one or more image sets based on at least one of grouping by events and grouping by people present in the images; (c) automatically profiling the images within each image set according to image content, thereby relating a particular image set to one or more design themes; (d) providing a database of design elements that may be used to generate customized photo album pages; (e) utilizing the design themes generated by the profiling step to automatically suggest one or more design elements from the database of design elements; and (f) automatically generating a customized photo album page layout for each image set by applying one or more of the suggested design elements to the page layout.

24 Claims, 7 Drawing Sheets

U.S. PATENT DOCUMENTS

2003/0182210 A1* 9/2003 Weitzman et al. ............ 705/27
2004/0250205 A1* 12/2004 Conning ..................... 715/517

FOREIGN PATENT DOCUMENTS

| EP | GB 2367158 A | 3/2002 |
| WO | WO 02/01537 A2 | 1/2002 |
| WO | WO 02/41188 A1 | 5/2002 |

OTHER PUBLICATIONS

U.S. Appl. No. 09/750,858, filed Dec. 29, 2000, Joseph M. Geigel et al.
U.S. Appl. No. 10/042,605, filed Jan. 9, 2002, Henry Nicponski.
U.S. Appl. No. 10/143,272, filed May 10, 2002, Lawrence S. Chen et al.

"What's the difference between men and women? Evidence from facial measurement" by Burton, Bruce and Dench. *Perception*, vol. 22, pp. 153-176, 1993.
"Rapid Object Detection using a Boosted Cascade of Simple Features" by P. Viola and J. Jones, in *International Conference on Computer Vision and Pattern Recognition*, 2001.
"The ISCC-NBS method of designating colors and a dictionary of color names" by K.L. Kelly and D.B. Judd in the Natioanl Bureau of Standards Circular (553), Nov. 1, 1955.
"Learning Gender with Support Faces" by B. Moghaddam and M.-H. Yang in *IEEE Transactions on Pattern Analysis and Machine Intelligence*, vol. 24, No. 5, pp. 707-711, May 2002.
"An automatic facial feature finding system for portrait images" by Bolin and Chen in the *Proceedings of IS&T PICS* conference, 2002.

* cited by examiner

Figure 5

| Feature number | Feature name | Calculation |
|---|---|---|
| 0 | Inter-ocular distance | P1 – P0 |
| 1 | Chin angle | Radians subtended by lines P78-P75 and P72-P75 |
| 2 | Jaw width | P73 – P77 |
| 3 | Mouth width | P27 – P23 |
| 4 | Nose width | P39 – P37 |
| 5 | Face width | P69 – P81 |
| 6 | Distance between eyebrows | P48 – P44 |
| 7 | Head width | P67 – P57 |
| 8 | Forehead width | Mean (P42 – P60, P50 – P64) |
| 9 | Eyebrow width | Mean (P46 – P42, P54 – P50) |
| 10 | Distance between pupil of eye and bottom of eyebrow | Mean (P0 – P46, P1 – P54) |
| 11 | Cheek width | Mean (P69 – P27, P81 – P23) |
| 12 | Distance between nose and lip | P32 – P2 |
| 13 | Thickness of lower lip | P29 – P35 |
| 14 | Distance between lip and chin | P75 – P35 |
| 15 | Distance from head to chin | P75 – P62 |
| 16 | Distance between eye and nose | Mean (P37 – P7, P39 – P13) |
| 17 | Distance between eye and mouth | Mean (P23 – P0, P27 – P1) |
| 18 | Distance between eye and chin | Mean (P75 – P7, P75 – P13) |

Figure 6

| Feature number | Significance | Histogram difference used |
|---|---|---|
| 19 | Checks for presence of beard | Chin patch − cheek patch |
| 20 | Checks for presence of mustache | Upper lip patch − cheek patch |
| 21 | Checks for presence of hair on forehead | Forehead patch − cheek patch |
| 22 | Checks for presence of longer hair | Patch next to ear − head patch |

FIG. 6B

| Patch | Bounding box | | | |
|---|---|---|---|---|
| | x-start | y-start | width | height |
| Cheek | P80[x] +1/3 (P37 − P80) | Mean (P9[y], P81[y]) | 2/3 (P37 − P80) | P80 − P81 |
| Head | P61[x] | P62[y] − height | P63 − P61 | P68 − P17 |
| Near ear | P68[x] + width | P68[y] | P68 − P17 | P71 − P68 |
| Forehead | P60[x] | Mean (P60[y], P64[y]) | P64 − P60 | 2/3 Feature 8 |
| Above lip | P23[x] | P38[y] | P27 − P23 | P38 − P25 |
| Chin | Mean (P30[x], P76[x]) | Mean (P75[y], P35[y]) | Mean (P28 − P30, P74 − P76) | ½ (P75 − P35) |

FIG. 6A

| Image type | Gender | Age | Design themes |
|---|---|---|---|
| Portrait | M, F | S, S | senior couple |
| Portrait | - | B | baby |
| Portrait | F, - | A, B | mother-child |
| Group portrait | F, F, F | C, C, C | girls |
| Group portrait | M, F, M | S, S, C | grandparents |
| Large group | Ms, Fs | As, Ss, Cs | traditional |
| Snapshot | M, F, F | A, A, C | family |
| Non-face | - | - | abstract |

M : male; F: female; S: senior; A: adult; C: child; B: baby; s indicates many

METHOD FOR GENERATING CUSTOMIZED PHOTO ALBUM PAGES AND PRINTS BASED ON PEOPLE AND GENDER PROFILES

CROSS REFERENCE TO RELATED APPLICATION

This application claims the benefit of U.S. Provisional application No. 60/432,900, filed Dec. 12, 2002, the entire disclosure of which is hereby incorporated herein by reference.

FIELD OF THE INVENTION

The invention relates generally to the field of digital image processing, and in particular to a method for suggesting suitable designs for album pages and customized prints based on the image content and the demographics of people present in the images.

BACKGROUND OF THE INVENTION

With the advent of digital imaging technology, it has become possible for consumers to create customized products such as photo greeting cards, framed prints and albums inexpensively. Even if the original image is available only as a traditional paper print, it is possible to use a photo kiosk to scan the image and use it creatively in a new print product.

There are a number of commercially available software products that provide custom printing services to be used for printing on a home printer. Photo kiosks provide similar services for printing at the kiosk itself. Typically, these products provide a very wide selection of possible colors and designs for use as background and/or around the border of the print. Most products also allow for the addition of text on or around the image, and there are numerous choices of fonts, sizes and colors available for this purpose. The user selects an image or a set of images to be used. Examples of custom printing software include Microsoft's Picture It, ArcSoft's PhotoPrinter, and others such as PrintSix, Photo-Elf and ImageBuddy.

Albuming software products provide a variety of templates for page layout and themed decorations, in addition to backgrounds and borders. Some albuming softwares offer choices of music or audio to include with each album page of a digital album (soft copy), to produce a multimedia presentation for the viewer. Some examples of albuming softwares include DogByte's Creative Photo Album, flipalbum.com's FlipAlbum, Xequte's Diji album and also Microsoft's Picture It.

In a typical situation, the consumer needs to spend a lot of time at a task such as albuming or generating customized prints, most of the time being spent in searching for suitable image sets from the consumer's image collection and trying out the various options and their combinations till a visually pleasing combination is found. Since software products in this application area typically offer hundreds of options for each choice to be made (in some cases, thousands), it is increasingly difficult for a consumer to produce an effective presentation of their image(s) easily and quickly. The consumer can get tired of exploring all possible combinations and settle on one which does not meet all their criteria, causing dissatisfaction.

In U.S. Pat. No. 6,389,181 issued on May 14, 2002, Shaffer et al discuss a method for automatically producing a photocollage by employing image recognition techniques. However, their method of selecting layout and page design is based on the availability of a customer profile containing the customer's color preferences, layout preferences and design considerations. The image content is not used in this process. Face recognition is used for grouping images, assuming that sample faces and identification of all members of the customer's family are available in the customer profile. A scenario where a comprehensive customer profile such as this is available is hard to achieve in practice.

In the International Application WO 02/01537 A2 published on Jan. 3, 2002, Cohen-Solal et al use demographic information and the number of people, as in the present invention, for adapting the content of a display screen. Here, these characteristics are estimated from live video feed and mapped to audio-visual presentations that will be most relevant for viewing, given the current audience. The mapping is customized to cater to the interests of specific groups, for example, a primarily male audience may prefer sports highlights or a frequently moving audience may require short presentations. A similar automatic customization would be useful but is currently unavailable for the album generation process.

A need therefore exists to provide the consumer with fewer, but well-crafted, choices that would help them to achieve the given task (albuming, custom printing, etc.) quickly and satisfactorily. The suggested choices should be appropriate for the image content displayed, and provide a complete solution that takes into account all the interactions between individual elements, e.g., the color of background should work well with the border chosen. This process would not limit the consumers' choices, as the suggestions could provide the starting points for more explorations if the consumer so wishes.

SUMMARY OF THE INVENTION

The present invention is directed to overcoming one or more of the problems set forth above. Briefly summarized, according to one aspect of the present invention, the invention resides in a method for generating customized photo album pages for a collection of digital images, where the method comprises the steps of: (a) obtaining a plurality of digital images; (b) automatically grouping the images into one or more image sets based on at least one of grouping by events and grouping by people present in the images; (c) automatically profiling the images within each image set according to image content, thereby relating a particular image set to one or more design themes; (d) providing a database of design elements that may be used to generate customized photo album pages; (e) utilizing the design themes generated by the profiling step to automatically suggest one or more design elements from the database of design elements; and (f) automatically generating a customized photo album page layout for each image set by applying one or more of the suggested design elements to the page layout.

The manual selection of image sets for albuming/custom printing is a time-consuming process involving browsing large image collections. According to one of its advantages, this invention provides an automated solution to the problem of finding image sets that form a cohesive unit for the albuming task. The user can select image sets by event, or by people present in the images, or a combination of the two methods, e.g., images of a particular person taken during a particular event.

It is a well-known observation that the type of themes selected by consumers for displaying their image(s) is closely related to the gender and ages of the people appearing in the images. For example, a baby's picture is displayed with themed embellishments such as toys. A girl's portrait may be displayed with colors such as pink and floral motifs. An adult male and female may fit the model of a couple, and the consumer may be looking for themes suitable for a couple. Similarly, a scene without any people (such as scenery) may need to be displayed with colors that complement the color composition of the scene.

According to another of its advantages, the present invention uses the demographics, image type (portrait, large group, etc.) and the color content of images as the basis for selection of a group of suggested display elements. The options suggested are based on a custom-designed mapping between image characteristics and display element groups that takes into account current trends in design and cultural preferences. Once created, this mapping would produce suitable photo decoration options for different types of situations, making the process of photo product generation at the kiosk or home more pleasurable and less time consuming.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 5 is a table of measurement-based features used for gender classification in the present invention.

FIG. 6A defines a set of bounding boxes identifying a set of image patches and FIG. 6B shows a table of histogram features based on differences between the patches identified in FIG. 6A, and as used for gender classification in the present invention.

DETAILED DESCRIPTION OF THE INVENTION

Because image processing systems employing albuming software are well known, the present description will be directed in particular to attributes forming part of, or cooperating more directly with, method in accordance with the present invention. Attributes of the method not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

The present invention provides the consumer with a suggested set of choices for display elements that are appropriate for the type(s) of picture(s) used in the photo product. Image sets can be selected based on grouping by events or by people or a combination of the two. Display elements consist of image backgrounds, borders, frames, layouts, background music (for digital albums) and any other display options provided by the system. The selection of the various display elements is based on the content of the image; with emphasis on the description of people present in the image. Automatic image processing algorithms are used to determine if people are present in an image, and demographic information (gender and age) about them. This invention provides an automated solution to the problem of finding image sets that form a cohesive unit for the albuming task. The user can select image sets by event, or by people present in the images, or a combination of the two methods, e.g., images of a particular person taken during a particular event.

Figure 1:
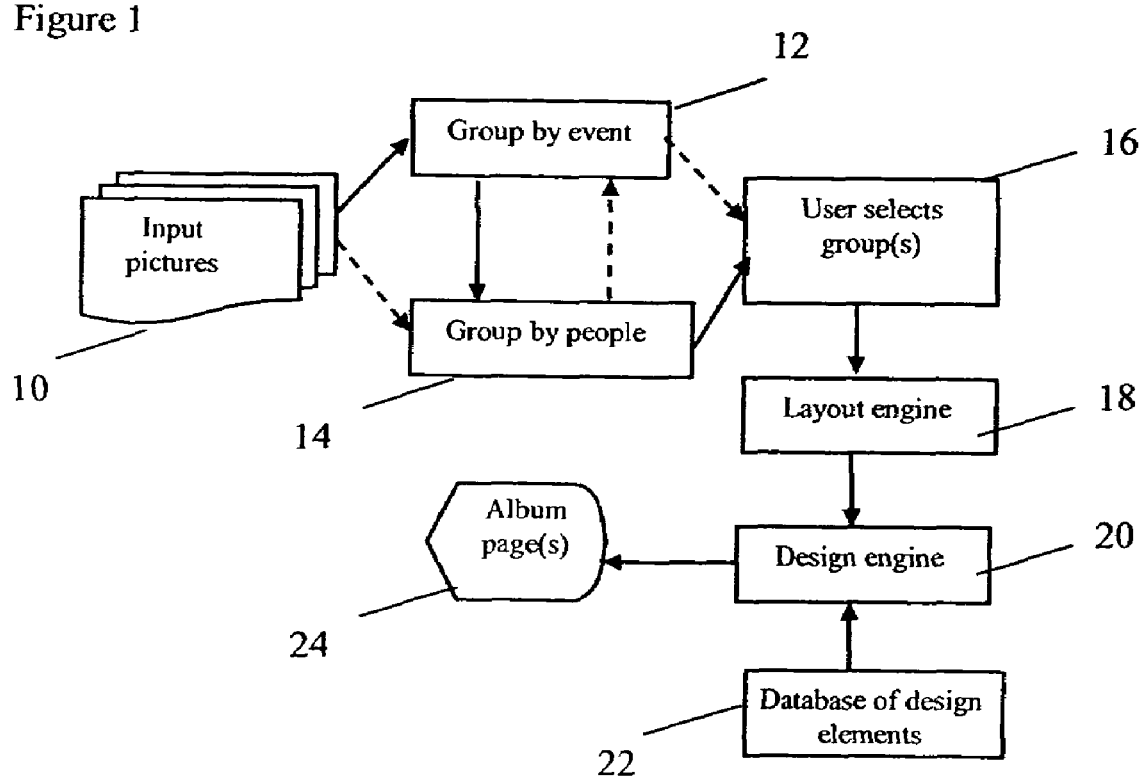
FIG. 1 is a flowchart of the overall system for automation-aided albuming proposed in the present invention.

Referring to FIG. 1, the consumers' digital image collection or a subset thereof 10 is grouped by event 12 and by people present in images 14. The consumer may choose either criteria—event or people—for grouping, or both in any order, based on the semantics of the task. For example, to create an album of the events in a baby's first year, the user may first group images by people, and then group by events after selecting the group depicting the baby; whereas, to create an album to share vacation experiences with a friend, the user may first group by event (vacation) and then by people (to find images containing the user). Grouping by event 12 is achieved using the method described in U.S. Pat. No. 6,351,556, entitled "A Method for Automatically Comparing Content of Images for Classification into Events", by Loui and Pavie issued on Feb. 26, 2002; and grouping by the identity of people present in the images 14 uses the method of clustering by facial similarity described in U.S. Ser. No. 10/143,272, entitled "Method and Apparatus for Organizing and Retrieving Images Containing Human Faces" filed 10 May 2002 in the names of Chen et al, both of which are incorporated herein by reference.

Figure 2:
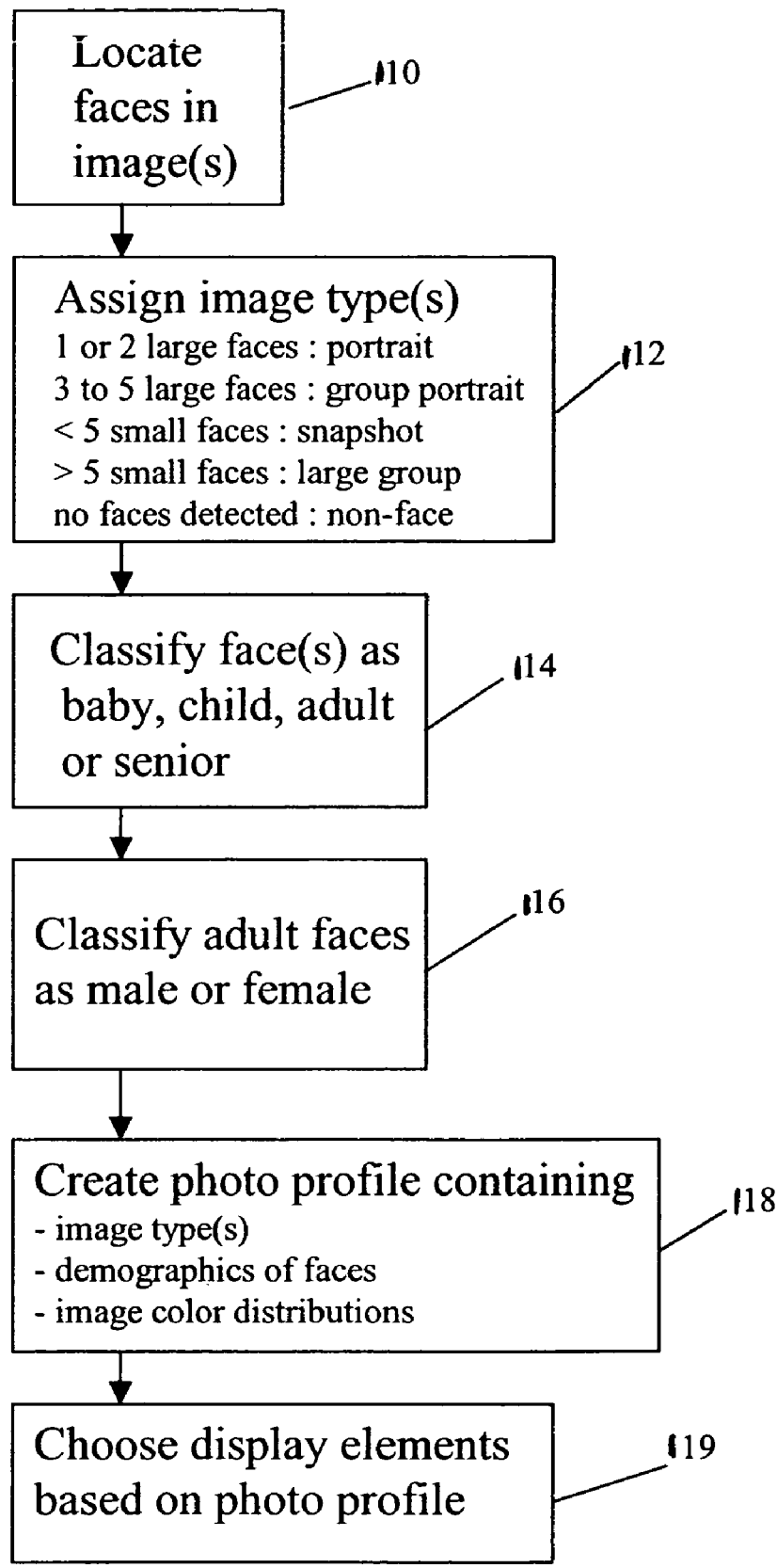
FIG. 2 is a flowchart of the method of determining display elements in the present invention.

The user can then select the group(s) 16 of images to include in the album. The grouping algorithms also provide emphasis scores to each image relative to other images in the group. In grouping by people, an emphasis score is assigned to each retrieved image, given by the fraction of the image covered by the faces of the specified people. In event-based grouping, this score is based on image quality (sharpness, contrast, etc.) and composition. The emphasis scores are used by the layout engine 18 to generate page layouts, as described in U.S. Ser. No. 09/750,858, entitled "System and Method for Automatic Layout of Images in Digital Albums" by Geigel and Loui filed on 29 Dec. 2000, which is incorporated herein by reference. The design engine 20, which uses the method described in connection with FIG. 2, is then used to suggest designs appropriate for the selected image set from the database of design elements 22 based on the photo profile generated. The album page(s) 24 are created with the selected layout and design choices.

Figure 3:
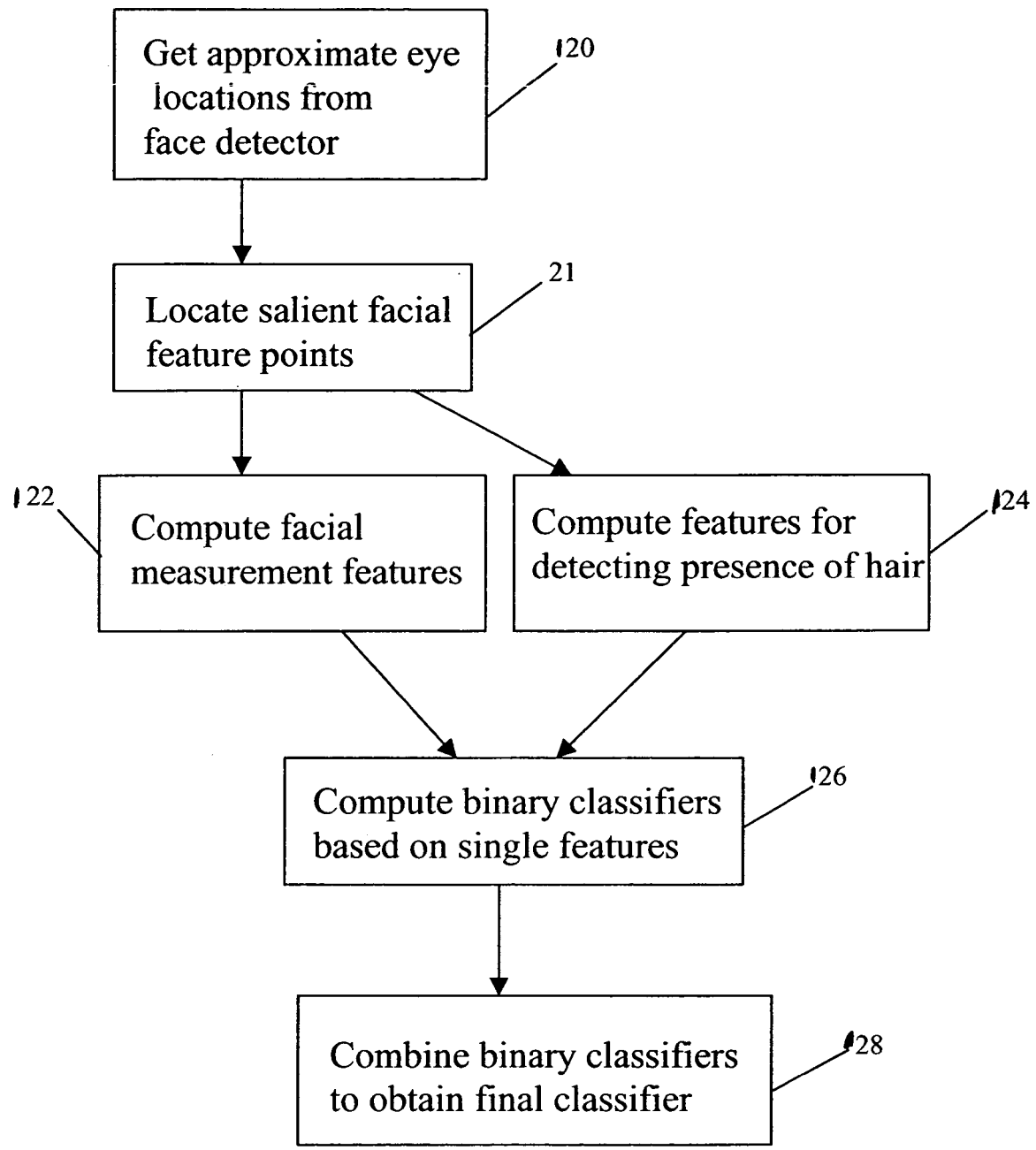
FIG. 3 is a flowchart of the gender classification method according to the present invention.

Referring to FIG. 2, which shows the design engine 20 of FIG. 1, human faces are located 110 in the digital image(s) selected by the user for creating a customized print or album page. There are a number of known face detection algorithms that can be used for this purpose. In a preferred embodiment, the face detector described in commonly-assigned U.S. Ser. No. 10/042,605, entitled "Method and System for Processing Images for Themed Imaging Services" filed Jan. 9, 2002 by Nicponski is used, which is incorporated herein by reference. The face detector is based on a Bayesian classifier trained with examples of face and non-face images. The face detector outputs the locations and sizes of faces found in the image(s). Based on the number and size of faces detected, the image is assigned 112 an image type—for example, portrait (or close-up), group portrait, snapshot, large group or non-face. Each face detected is classified 114 as baby, child, adult or senior. A method for assigning a face to an age category is described in U.S. Pat. No. 5,781,650, entitled "Automatic Feature Detection and Age Classification of Human Faces in Digital Images" by Lobo issued on Jul. 14, 1998, which is incorporated herein by reference. That method uses ratios of facial measurements that are known to change with age due to bone structure development. The adult faces are further classified 116 as male or female. A gender classification method described in "Learning Gender with Support Faces" by B. Moghaddam and M.-H. Yang in *IEEE Transactions on Pattern Analysis and Machine Intelligence*, vol. 24, no. 5, pp. 707-711, May 2002, can be used for the purpose, which is incorporated herein by reference. However, this method is not accurate (a correct classification rate of about 70% is observed) on un-aligned faces, where the eye locations are not known accurately (as in this case). In the preferred embodiment, gender classification involves the steps shown in FIG. 3.

Figure 4:
FIG. 4 is an illustration of the location of facial feature points on a human face.

The approximate eye locations are obtained 120 from the face detector and used to initialize the starting face position for facial feature finding. Eighty-two facial feature points are detected 121 using the Active Shape Model-based method described in "An automatic facial feature finding system for portrait images", by Bolin and Chen in the *Proceedings of IS&T PICS conference*, 2002, which is incorporated herein by reference. Their method uses local texture matching to localize feature points, followed by the application of global shape constraints learned from training examples. FIG. 4 shows the locations of the feature points on a face.

Some facial measurements that are known to be statistically different between men and women (ref. "Anthropometry of the Head and Face" by Farkas (Ed.), 2$^{nd}$ edition, Raven Press, New York, 1994, and "What's the difference between men and women? Evidence from facial measurement" by Burton, Bruce and Dench, *Perception*, vol. 22, pp. 153-176, 1993) are computed 122. FIG. 5 lists the features used, where Pn refers to facial point number n from FIG. 4. The features are normalized by the inter-ocular distance, to eliminate the effect of differences in the raw size of the face. For symmetrical features, measurements from the left and right side of the faces are averaged to produce more robust measurements.

According to the invention, additional performance improvement is obtained by using the presence or absence of hair in specific locations on and around the face as cues for gender determination. These features are incorporated 124 as a difference in gray-scale histograms between the patch where hair may be present, and a reference patch on the cheek that is typically hairless. The bounding box for the patches are automatically computed as shown in FIG. 6A based on the feature points, and relevant histogram difference-based features are computed as shown in FIG. 6B.

Binary classifiers are constructed 126 using each of the twenty-two single features (listed in FIGS. 5 and 6) separately. Simple Bayesian classifiers described in standard literature (*Pattern Classification* by R. O. Duda, P. E. Hart and D. G. Stork, John Wiley and Sons, 2001) are trained on large sets of example male and female faces to produce the single feature-based binary classifiers. The classification accuracy of each of these binary classifiers ranged from 55 to 75%.

The binary classifiers were combined using the AdaBoost algorithm to produce 128 an improved final classifier. AdaBoost is a well-known algorithm for boosting classifier accuracy by combining the outputs of weak classifiers (such as the single feature binary classifiers described above). The weighted sum of outputs of the weak classifiers is compared with a threshold computed automatically from the training examples. A description and application of this method is available in "Rapid Object Detection using a Boosted Cascade of Simple Features" by P. Viola and M. Jones, in *International Conference on Computer Vision and Pattern Recognition*, 2001, which is incorporated herein by reference. The classification accuracy of the final classifier obtained using AdaBoost was 90% on un-aligned faces.

Referring back to FIG. 2, and based on the information computed above, each image is assigned 118 a photo profile, which includes the image type, the ages and genders of the people (if any) present in the image, and the color distributions in the image. The color distribution is described as the proportion of pixels in each of the major color categories as defined in "The ISCC-NBS method of designating colors and a dictionary of color names" by K. L. Kelly and D. B. Judd in the *National Bureau of Standards Circular* (553), Nov. 1, 1955—red, blue, yellow, green, pink, purple, brown, orange, olive, white, black and gray.

Figures 7, 8:
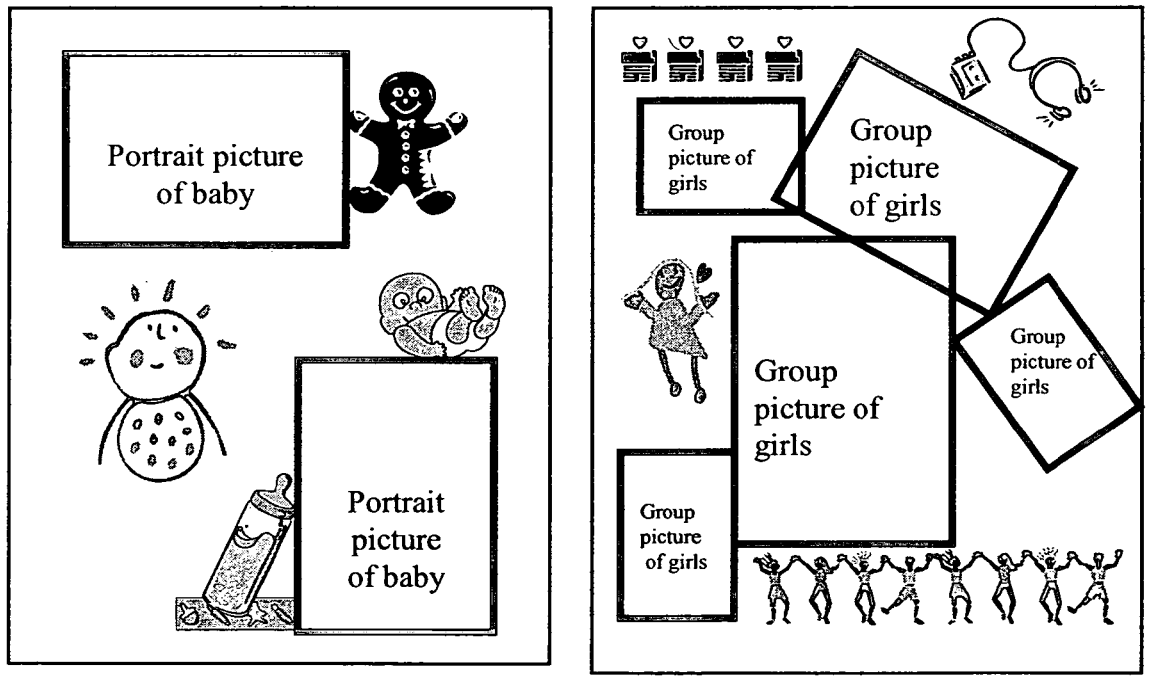
FIG. 7 is an example of a table mapping photo profile information to design groups.
FIG. 8 shows two examples of design elements suggested by the proposed system.

A large number of consumer images from family photo collections, where the relationships between individuals were known, are analyzed to determine if there are any likely relationships given the age and genders detected. These common scenarios are used to pick out designs 119 appropriate in that scenario. FIG. 7 shows some examples of tables that map the photo profiles to design themes. Each design group needs to be custom-designed and updated periodically to reflect current trends in design and cultural preferences. The color of the design elements, border and background are selected based on the color distribution in the image. The color scheme in each case may be coordinating (colors pre-dominant in the image are chosen), complementary (colors contrasting with the pre-dominant colors in the image are chosen) or neutral (unsaturated versions of the pre-dominant colors are chosen). If the product being created is a multimedia presentation, music clippings are also suggested as part of the design theme based on gender and ages of people in the images.

At the end of the process, the user is presented with a limited number (typically around 5) of complete design selections. Abstracts and neutrals are included in the options in all cases, since there may be errors in face detection and the age/gender determination steps. FIG. 8 shows two examples of the design elements suggested for a page with portrait pictures of a baby (left) and a page with group pictures of girl children (right).

The invention has been described with reference to a preferred embodiment. However, it will be appreciated that variations and modifications can be effected by a person of ordinary skill in the art without departing from the scope of the invention.

Parts List 10 digital image collection
12 event grouping
14 people grouping
16 group selection
18 layout engine
20 design engine
22 database of design elements
24 album pages
110 locate faces step
112 assign image type step
114 classify by age group step
116 classify by gender step
118 create photo profile step
119 choose display elements step
120 get eye locations step
121 locate feature points step
122 compute facial measurements step
124 compute histogram-based features step
126 compute binary classifiers step
128 combine binary classifiers step

What is claimed is:

1. A method implemented by an image processing system for facilitating generation of a customized photo album for a collection of digital images, said method comprising the steps of:
obtaining a set of digital images;
identifying age information associated with a person identified in the set of digital images;
identifying one or more suggested display elements from a database of display elements based at least upon the age information; and
generating a customized photo album page for the set of digital images by applying one or more of the suggested display elements to the page.

2. The method of claim 1, further comprising the step of identifying gender information associated with the person identified in the set of digital images, wherein the step of identifying the one or more suggested display elements includes identifying the one or more suggested display elements from the database of display elements based at least upon the age information and the gender information.

3. The method of claim 2, further comprising the step of identifying numbers of people identified in each image of the set of digital images, wherein the step of identifying the one or more suggested display elements includes identifying the one or more suggested display elements from the database of display elements based at least upon the age information, the gender information, and the numbers of people identified in each image of the set of digital images.

4. The method of claim 3, wherein the numbers of people are identified by a number of faces identified in each image of the set of digital images.

5. The method of claim 1, further comprising the step of identifying numbers of people identified in each image of the set of digital images, wherein the step of identifying the one or more suggested display elements includes identifying the one or more suggested display elements from the database of display elements based at least upon the age information and the numbers of people identified in each image of the set of digital images.

6. The method of claim 5, wherein the numbers of people are identified by a number of faces identified in each image of the set of digital images.

7. The method of claim 6, wherein the step of identifying one or more suggested display elements identifies the one or more suggested display elements at least by using the numbers of faces identified in each image of the set of digital images to determine whether each image in the set is an individual portrait, a group portrait, a large group picture, a snapshot picture, or a picture without faces.

8. The method of claim 1, further comprising the step of identifying numbers of and sizes of faces identified in each image of the set of digital images, wherein the step of identifying the one or more suggested display elements includes identifying the one or more suggested display elements from the database of display elements based at least upon the age information and the numbers of and sizes of faces identified in each image of the set of digital images.

9. The method of claim 1, wherein the step of identifying one or more suggested display elements identifies more than one suggested display element from the database of display elements.

10. The method of claim 9, further comprising the step of presenting the suggested display elements to a user for selection.

11. The method of claim 1, further comprising the steps of:
obtaining the collection of digital images;
grouping the collection of digital images into a plurality of image sets based on at least grouping by events, grouping by people present in the images, or both grouping by events and by grouping by people present in the images,
wherein the set of digital images is one of the grouped image sets, and
wherein the two identifying steps and the generating step are performed for each of the plurality of image sets, thereby generating a plurality of customized photo album pages.

12. The method of claim 11, further comprising the step of assembling each of the customized photo album pages into a customized photo album.

13. A computer readable storage medium storing instructions configured to cause a data processing system to implement a method for facilitating generation of a customized photo album for a collection of digital images, wherein the instructions comprise:
instructions for obtaining a set of digital images;
instructions for identifying age information associated with a person identified in the set of digital images;
instructions for identifying one or more suggested display elements from a database of display elements based at least upon the age information; and
instructions for generating a customized photo album page for the set of digital images by applying one or more of the suggested display elements to the page.

14. The computer readable storage medium of claim 13, wherein the instructions further comprise instructions for identifying gender information associated with the person identified in the set of digital images, wherein the instructions for identifying the one or more suggested display elements includes instructions for identifying the one or more suggested display elements from the database of display elements based at least upon the age information and the gender information.

15. The computer readable storage medium of claim 14, wherein the instructions further comprise instructions for identifying numbers of people identified in each image of the set of digital images, wherein the instructions for identifying the one or more suggested display elements includes instructions for identifying the one or more suggested display elements from the database of display elements based at least upon the age information, the gender information, and the numbers of people identified in each image of the set of digital images.

16. The computer readable storage medium of claim 15, wherein the numbers of people are identified by a number of faces identified in each image of the set of digital images.

17. The computer readable storage medium of claim 13, wherein the instructions further comprise instructions for identifying numbers of people identified in each image of the set of digital images, wherein the instructions for identifying the one or more suggested display elements includes instructions for identifying the one or more suggested display elements from the database of display elements based at least upon the age information and the numbers of people identified in each image of the set of digital images.

18. The computer readable storage medium of claim 17, wherein the numbers of people are identified by a number of faces identified in each image of the set of digital images.

19. The computer readable storage medium of claim 18, wherein the instructions for identifying one or more suggested display elements identifies the one or more suggested display elements at least by using the numbers of faces identified in each image of the set of digital images to determine whether each image in the set is an individual portrait, a group portrait, a large group picture, a snapshot picture, or a picture without faces.

20. The computer readable storage medium of claim 13, wherein the instructions further comprise instructions for identifying numbers of and sizes of faces identified in each image of the set of digital images, wherein the instructions for identifying the one or more suggested display elements includes instructions for identifying the one or more suggested display elements from the database of display elements based at least upon the age information and the numbers of and sizes of faces identified in each image of the set of digital images.

21. The computer readable storage medium of claim 13, wherein the instructions for identifying one or more suggested display elements identifies more than one suggested display element from the database of display elements.

22. The computer readable storage medium of claim 21, wherein the instructions further comprise instructions for presenting the suggested display elements to a user for selection.

23. The computer readable storage medium of claim 13, wherein the instructions further comprise:
  instructions for obtaining the collection of digital images;
  instructions for grouping the collection of digital images into a plurality of image sets based on at least grouping by events, grouping by people present in the images, or both grouping by events and by grouping by people present in the images,
  wherein the set of digital images is one of the grouped image sets, and
  wherein the two instructions for identifying and the instructions for generating are performed for each of the plurality of image sets, thereby generating a plurality of customized photo album pages.

24. The computer readable storage medium of claim 23, wherein the instructions further comprise instructions for assembling each of the customized photo album pages into a customized photo album.

* * * * *